UNITED STATES PATENT OFFICE.

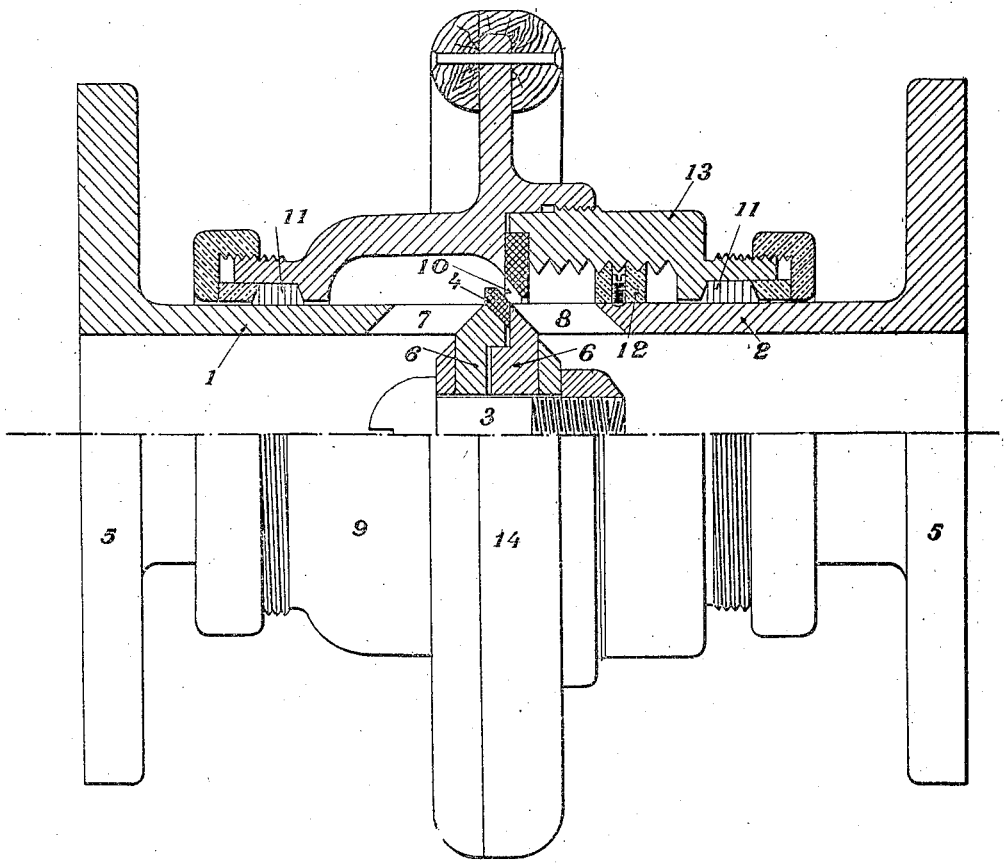

FRANÇOIS MARIE PAUL BLACHE, OF LA RICAMARIE, FRANCE.

COCK.

1,340,107.  Specification of Letters Patent.  Patented May 11, 1920.

Application filed October 10, 1918. Serial No. 257,588.

*To all whom it may concern:*

Be it known that I, FRANÇOIS MARIE PAUL BLACHE, citizen of the Republic of France, residing at La Ricamarie, Loire, in the Republic of France, have invented new and useful Improvements in Cocks, of which the following is a specification.

This invention relates to an improved construction of cock provided with a ring shaped distributer, in which the casing of the cock is stationary, the distributer being arranged to slide at the outside of said casing for the purpose of controlling the flow of fluid through the conduit upon which the cock casing is mounted.

The annexed drawing is a half longitudinal section and a half elevation view of an embodiment of the improved cock constructed in accordance with the invention.

The casing of the cock is composed of two cylindrical members 1 and 2, the inside diameter of which is equal to that of the pipe line. The members 1 and 2 are provided at their outer ends with connecting flanges 5 by means of which they may be connected to the pipe sections through the medium of bolts. They may also be provided with threaded ends for screw couplings or any similar connecting means. Both members 1 and 2 are respectively closed at their inner end by a partition or end wall 6 cast integral with the same and said walls are secured together by means of a central bolt 3. An annular valve seat 4 is held between said end walls 6. At a point close to their inner ends, the members 1 and 2 are provided with side openings or ports 7 and 8, respectively, the total area of the ports in each member being equal to the cross sectional area of the pipe line.

The distributer or movable member of the cock is composed of two cylindrical members 9 and 13 which are held together by threaded parts and have an annular contact member 10 clamped between them, said contact member being adapted to be seated on the fixed seat 4 when the distributer is suitably displaced along the cock casing.

When the distributer is actuated in such a way that the member 10 is moved away from the seat 4, a communication is afforded between the members 1 and 2 through the ports 7 and 8 and a recess or chamber provided in the distributer member 9 at the place located around the ports 7. A tight joint is provided between the ends of the distributer and the outer surface of the casing members 1, 2 by means of stuffing boxes such as 11 for gaseous fluids or leather cups in the case of liquids.

The distributer may be moved along the casing by any suitable means either by hand or mechanically, the pressure of the fluid itself can also be used for that purpose. In the example shown, a threaded ring 12 is fixed on the member 2 of the casing and engages with the inner surface of the distributer member 13 which is threaded correspondingly. By rotating the handwheel 14 provided on the distributer, the latter can be moved along the cock casing.

It will be noted that the cock above described is always balanced whatever the pressure and free sectional area of the passage may be. The controlling means are all placed at the outside and the packings are accessible and may be tightened or renewed without the cock having to be taken apart.

Having now described my invention what I claim as new and desire to secure by Letters Patent is:

1. A cock comprising in combination a cock casing composed of two tubular oppositely and coaxially disposed members, end walls closing the adjacent inner ends of said members respectively, an annular valve seat arranged between said end walls, means for clamping the valve seat between said end walls and holding the latter together, side ports in the casing members near the end walls of the same, a ring shaped distributer arranged around the cock casing and adapted to slide along the same, an annular contacting face on said distributer adapted to contact with the valve seat, a recess in the distributer at one side of the said contacting surface and means for providing a tight joint between the distributer and the cock casing.

2. A cock comprising in combination: a cock casing composed of two tubular oppositely and coaxially disposed members, end walls closing the adjacent inner ends of said members, respectively, an annular valve seat arranged between said end walls, means for clamping the valve seat between said end walls and holding the latter together, side ports in the casing members near the end walls of the same, a ring shaped distributer arranged around the cock casing and adapted to slide along the same, said distributer being composed of two coaxial tubular members arranged end to end, means for securing said members to each other, an annular contact member adapted to be clamped between said members and to contact with the valve seat, a recess in the distributer at one side of the said contact member, means for providing a tight joint between the ends of the distributer and the cock casing and means for moving the distributer along said cock casing.

3. A cock comprising in combination: a cock casing composed of two tubular oppositely and coaxially disposed members, end walls closing the adjacent inner ends of said members, respectively, an annular valve seat arranged between said end walls, means for clamping the valve seat between said end walls and holding the latter together, side ports in the casing members near the end walls of the same, a ring shaped distributer arranged around the cock casing and adapted to slide along the same said distributer being composed of two coaxial tubular members arranged end to end, means for securing said members to each other, an annular contact member adapted to be clamped between said members and to contact with the valve seat, a recess in the distributer at one side of the said contact member, means for providing a tight joint between the ends of the distributer and the cock casing, threaded parts on the cock casing and the distributer, respectively, said threaded parts being in engagement with each other and a handwheel on the distributer, substantially as described and for the purpose set forth.

In testimony whereof I have signed my name to this specification in the presence of two subscribing witnesses.

FRANÇOIS MARIE PAUL BLACHE.

Witnesses:
JEAN FRANÇOIS PELAY,
GINCHARD JACQUES.